US010014967B2

(12) United States Patent
Xie et al.

(10) Patent No.: US 10,014,967 B2
(45) Date of Patent: Jul. 3, 2018

(54) SYSTEM AND METHOD FOR AUTHENTICATING A BROADCAST DEVICE USING FACIAL RECOGNITION (71) Applicant: Huami Inc., Sunnyvale, CA (US)

(72) Inventors: Wei Xie, Palo Alto, CA (US); Fei Wang, Fremont, CA (US)

(73) Assignee: Huami Inc., Mountain View, CA (US)

( * ) Notice: Subject to any disclaimer, the term of this patent is extended or adjusted under 35 U.S.C. 154(b) by 0 days.

(21) Appl. No.: 14/948,755

(22) Filed: Nov. 23, 2015

(65) Prior Publication Data
US 2017/0149517 A1    May 25, 2017

(51) Int. Cl.
G06K 9/00    (2006.01)
H04H 60/15    (2008.01)

(52) U.S. Cl.
CPC ......... *H04H 60/15* (2013.01); *G06K 9/00228* (2013.01); *G06K 9/00281* (2013.01); *G06K 9/00288* (2013.01); *G06K 9/00348* (2013.01)

(58) Field of Classification Search
CPC .......... G06K 9/00281; G06K 9/00288; G06K 9/00348; G06K 19/0716; G06K 19/07762; G06K 7/10396; G06Q 10/08; G06Q 50/04; G06Q 50/28; G06Q 90/00; G06Q 30/0269; G07C 9/00031; H04H 60/15; H04L 12/2803; H04L 67/12; H04L 67/22
USPC ................................ 382/283; 340/10.4, 561
See application file for complete search history.

(56) References Cited

U.S. PATENT DOCUMENTS

| 6,119,096 | A  | * | 9/2000  | Mann ...................... E05G 5/003 |
|           |    |   |         | 705/5 |
| 6,735,695 | B1 | * | 5/2004  | Gopalakrishnan ...... G06F 21/32 |
|           |    |   |         | 713/186 |
| 7,114,079 | B1 |   | 9/2006  | Cook et al. |
| 7,362,210 | B2 | * | 4/2008  | Bazakos ............ G06K 9/00228 |
|           |    |   |         | 340/10.1 |
| 7,813,559 | B2 | * | 10/2010 | Duquette ................. G06K 9/00 |
|           |    |   |         | 382/151 |
| 8,462,994 | B2 | * | 6/2013  | Ortiz ................... G07C 9/00087 |
|           |    |   |         | 340/5.8 |
| 8,831,294 | B2 | * | 9/2014  | Krupka .............. G06K 9/00221 |
|           |    |   |         | 382/118 |
| 8,893,969 | B2 | * | 11/2014 | Brandl ............... G06K 7/10059 |
|           |    |   |         | 235/380 |

(Continued)

Primary Examiner — Mekonen Bekele
(74) Attorney, Agent, or Firm — Young Basile Hanlon & MacFarlane, P.C.

(57) ABSTRACT

Systems and methods for authenticating a broadcast device using facial recognition are herein disclosed. The disclosure includes receiving, from a wearable device, a broadcast signal comprising an identification code of the wearable device; determining, using a processor, whether the identification code is stored within a database; identifying first facial data stored within the database, the first facial data associated with the identification code; generating second facial data; and determining, using the processor, whether the second facial data matches the first facial data. In an implementation, the broadcast device is a Bluetooth low energy device. In a further implementation, the broadcast device comprises the wearable device. In a still further implementation, the disclosure includes detecting gait data and determining whether the gait data matches gait feature data extracted from stored gait data features.

21 Claims, 4 Drawing Sheets

(56) References Cited

U.S. PATENT DOCUMENTS

| | | | | |
|---|---|---|---|---|
| 2002/0007717 A1* | 1/2002 | Uehara | G10H 1/0008 | 84/600 |
| 2005/0055582 A1* | 3/2005 | Bazakos | G06K 9/00228 | 726/19 |
| 2006/0262187 A1* | 11/2006 | Takizawa | G06K 9/00288 | 348/77 |
| 2007/0086626 A1* | 4/2007 | Mariani | G06K 9/00228 | 382/115 |
| 2008/0157925 A1* | 7/2008 | Batra | G06K 7/0008 | 340/10.1 |
| 2008/0175443 A1* | 7/2008 | Kahn | G06K 9/00348 | 382/115 |
| 2009/0167492 A1* | 7/2009 | Madafferi | G07C 9/00158 | 340/5.82 |
| 2010/0271187 A1* | 10/2010 | Uysal | G06K 7/0008 | 340/10.4 |
| 2011/0001827 A1* | 1/2011 | Ortiz | G07C 9/00087 | 348/156 |
| 2011/0138416 A1* | 6/2011 | Kang | G06F 3/0482 | 725/39 |
| 2011/0152726 A1* | 6/2011 | Cuddihy | A61B 5/112 | 600/595 |
| 2012/0096483 A1* | 4/2012 | Badam | H04H 60/23 | 725/30 |
| 2012/0154117 A1 | 6/2012 | Nice et al. | | |
| 2012/0191016 A1* | 7/2012 | Jastram | A61B 5/0002 | 600/595 |
| 2012/0194322 A1* | 8/2012 | Batra | G06K 7/0008 | 340/10.33 |
| 2013/0063581 A1* | 3/2013 | Komatsu | G06K 9/00926 | 348/77 |
| 2014/0285402 A1* | 9/2014 | Rahman | G06F 3/011 | 345/8 |
| 2015/0109104 A1* | 4/2015 | Fadell | G08B 27/003 | 340/5.65 |
| 2015/0136620 A1* | 5/2015 | Williams | H05K 5/02 | 206/216 |
| 2015/0288687 A1* | 10/2015 | Heshmati | H04L 63/0861 | 726/7 |
| 2015/0379791 A1* | 12/2015 | Russell | G07C 9/00031 | 340/5.61 |
| 2016/0066820 A1* | 3/2016 | Sales | A61B 5/1114 | 600/595 |
| 2016/0085218 A1* | 3/2016 | Pesonen | G05B 19/0428 | 700/28 |
| 2016/0209648 A1* | 7/2016 | Haddick | G02B 27/0093 | |
| 2017/0149517 A1* | 5/2017 | Xie | H04H 60/15 | |

* cited by examiner

SYSTEM AND METHOD FOR AUTHENTICATING A BROADCAST DEVICE USING FACIAL RECOGNITION

FIELD OF THE DISCLOSURE

This disclosure relates in general to authenticating a broadcast device using facial recognition.

BACKGROUND

The use of facial recognition as a means for verifying a subject's identity in order to grant access to a restricted area or item is becoming increasingly common. Facial recognition systems known in the art include identifying or generating a picture of the subject's face, extracting facial features therefrom, and matching those features against stored data. However, this process can be slow in that it typically requires comparing the extracted facial features against all data present within a database. Furthermore, given that a facial recognition process generally does not begin until the picture of the subject's face is identified or generated, these systems often require the subject to wait some time before the process is completed. Also, these systems may not provide adequate security in that they only require one level of authentication.

SUMMARY

The following presents a simplified summary of the specification in order to provide a basic understanding of some aspects of the specification. This summary is not an extensive overview of the specification. It is intended to neither identify key or critical elements nor delineate the scope of such aspects. Its purpose is to present some concepts of this disclosure in a simplified form as a prelude to the more detailed description that is presented later.

Disclosed herein is a method for authenticating a broadcast device using facial recognition, comprising receiving, from a wearable device, a broadcast signal comprising an identification code of the wearable device; determining, using a processor, whether the identification code is stored within a database; identifying first facial data stored within the database, the first facial data associated with the identification code; generating second facial data; and determining, using the processor, whether the second facial data matches the first facial data.

Also disclosed herein is a system for facial recognition using a broadcast device, comprising a memory and a processor configured to execute instructions stored in said memory for receiving, from a wearable device, a broadcast signal comprising an identification code of the wearable device; determining whether the identification code is stored within a database; identifying first facial data stored within the database, the first facial data associated with the identification code; generating second facial data; and determining whether the second facial data matches the first facial data.

Details of these implementations, modifications of these implementations and additional implementations are described below.

BRIEF DESCRIPTION OF THE DRAWINGS

The description herein makes reference to the accompanying drawings wherein like reference numerals refer to like parts throughout the several views, and wherein.

DETAILED DESCRIPTION

In a facial recognition context, an authentication device provides security and requires some type of authentication or validation prior to granting access to an object or area secured thereby. The authentication device is generally an interactive object with which a user initiates an authentication transaction. In certain implementations, the authentication device may be coupled to or otherwise in communication with a transaction station, which, for example, may be any of an entry gate, an exit gate, a computing device, a mobile device, a vending machine, an automatic teller machine, a self-service machine, a point of sales machine, and a security device; provided, however, that other implementations may be contemplated for the transaction station.

The authentication device may comprise a processor, a memory, an image capture component, and a broadcast scanner component, and is configured to process data stored within at least one database. Most notably, the authentication device will be used to authenticate a user by identifying certain identification materials of the user and comparing same against associated data stored within the at least one database. In the implementations herein described, the identification materials utilized by the authentication device are an identification code and facial data. As will be described in detail below, the identification code may be a character string transmitted as part of a broadcast signal from a wearable device and the facial data may be data identifying various facial features of a user generated or otherwise identified by the image capture component of the authentication device.

Briefly, upon detecting a broadcast signal comprising an identification code, the authentication device processes the records of at least one database (e.g., by searching through the data stored therein) for a matching identification code. Upon finding a matching identification code, the first facial data associated with the stored, matching identification code and stored within the database is identified. The authentication device then generates or otherwise identifies second facial data (e.g., by taking or scanning a picture of the face of the user requesting authentication) and compares such second facial data against the first facial data. In the event of a positive match, the authentication device may indicate the positive match to a coupled transaction station in granting access to the object or area secured by the authentication device.

Figure 1:
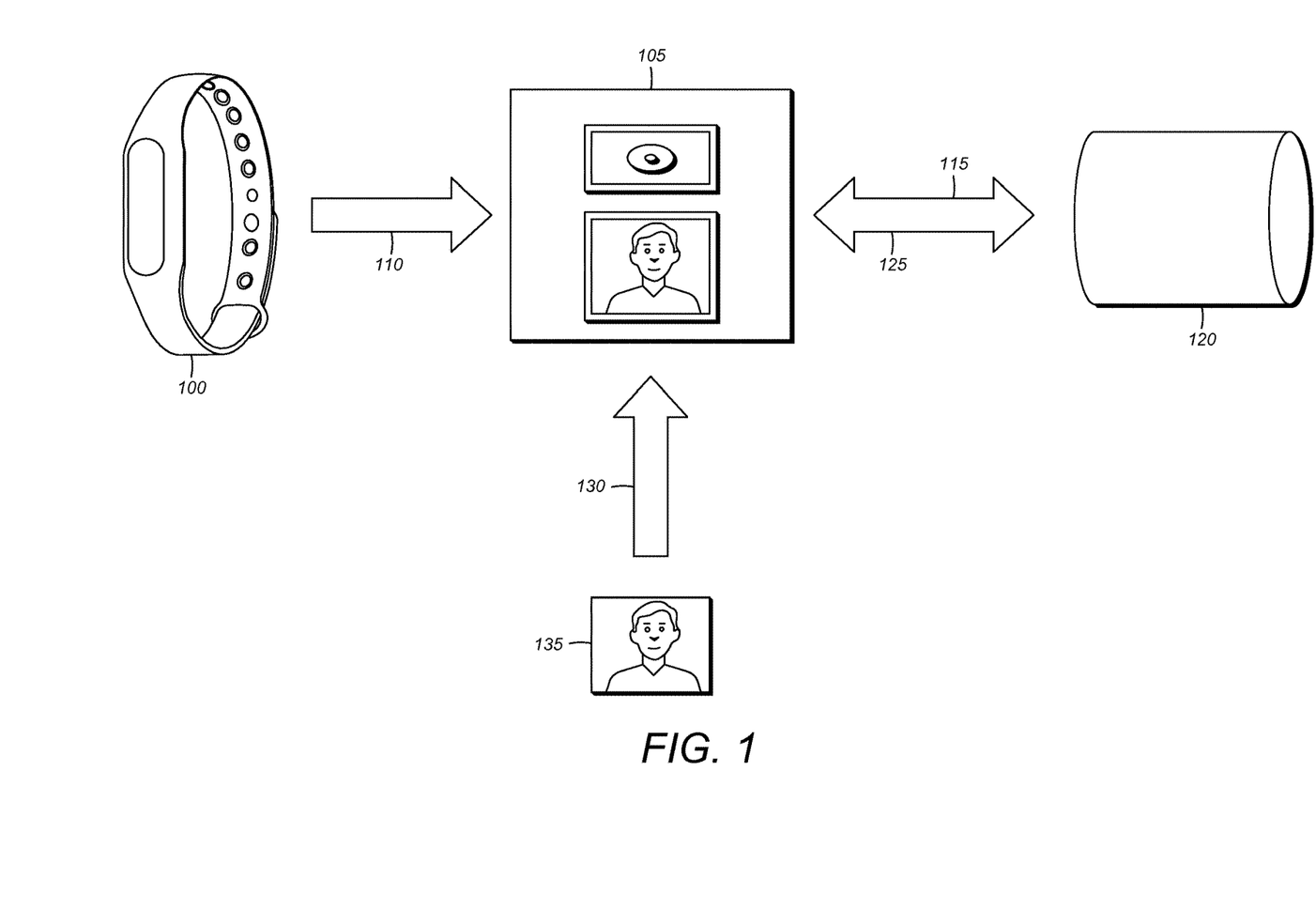
FIG. 1 is a diagram showing an example of data exchange between a broadcast device and an authentication device according to implementations of this disclosure.

FIG. 1 depicts the exchange of data between broadcast device 100 and authentication device 105 in authentication using facial recognition. Broadcast device 100 is a device capable of broadcasting broadcast signal 110 comprising an identification code. In an implementation, broadcast device 100 comprises a wearable device, such as a bracelet, watch, ring, or other wearable item. In an alternative implementation, broadcast device 100 comprises an electronic device such as a smartphone or other mobile device, which electronic device may, for example, be in communication with a wearable device as described in the preceding sentence. Notwithstanding the implementation, it will be apparent to one skilled in the art in view of this disclosure that broadcast device 100 is a "smart" device capable of broadcasting broadcast signal 110, for example, without first being interrogated for or otherwise being prompted to broadcast or transmit broadcast signal 110, and, further, broadcast signal 110 may be constantly broadcasted from broadcast device 100 until it is received, for example, by authentication device 105. To this end, and in a further implementation, broadcast device 100 is a Bluetooth® low energy device. Broadcast device 100 may further be any device configured to identify a user's location with respect to authentication device 105. For example, in an implementation wherein broadcast device 100 is a geolocation device such as a global position system mobile component, broadcast device 100 may be able to identify its proximity to authentication device 105 at a given time, and, upon achieving a minimum distance threshold, may automatically begin broadcasting to authentication device 105. It will be apparent to one skilled in the art in view of this disclosure that other implementations for broadcast device 100 not explicitly disclosed herein may be contemplated.

Authentication device 105 is configured to receive broadcast signal 110 from broadcast device 100. In an implementation, authentication device comprises a processor, a memory, an image capture component, and a broadcast scanner component, wherein the processor is configured to process data stored within database 120 in communication with authentication device 105 and process data received and/or generated by authentication device 105, such as broadcast signal 110 and second facial data 130. Receiving data by the broadcast scanner component may include receiving, observing, intercepting, determining, and otherwise identifying broadcast signal 110. In a further implementation, authentication device 105 is configured to determine a signal strength of broadcast device 100. Authentication device 105 may be an electronic panel coupled directly to a transaction station or a remote device in communication with at least one component of the transaction station. In an implementation, and as will be discussed in detail below, authentication device 105 comprises input and output features.

As previously discussed, broadcast signal 110 comprises an identification code that is used by authentication device 105 to authenticate broadcast device 100 using subsequent facial recognition based on facial data related to the identification code. The identification code broadcasted by broadcast device 100 as broadcast signal 110 is a unique code for identifying the user of broadcast device 100. In an implementation, the identification code is a username that the user has associated with broadcast device 100, for example, by using a computer to register the username with broadcast device 100. In an implementation, registration of a username includes transmitting a request to a server in communication with broadcast device 100, which server may process the request by querying a database to identify if the requested username is available. If it is, the server may indicate availability to the user and complete registration. If not, the server may indicate the lack of availability to the user and request the user to enter an alternative username. In an alternative implementation, the identification code is a character string passphrase assigned to the user by the server, for example, distinct from or for use instead of a username.

Assigned passphrase strings may be more secure in that they may not readily identify the user or be apparently associated with the user's account. In a further alternative implementation, the identification code may be a hash code, hexadecimal code, character array, or other computer-generated code comprising variations of letters, numbers, and/or punctuation. In other implementations, the identification code may be a code shared by multiple individuals, such as a pre-established group. For example, employees of a company may share a code unique to that company, or family members may share a code with their parents, siblings, and/or children. In a still further implementation, the identification code may be a MAC address or other unique identifier of the broadcast device. Notwithstanding the particular implementation thereof, the identification code is capable of being parsed and processed by authentication device 105.

Broadcast signal 110 is broadcasted by broadcast device 100 to authentication device 105. In an implementation, broadcast device 100 is configured to transmit broadcast signal 110 when the signal strength thereof as determined by authentication device 105 meets a set threshold value. That is, broadcast device 100 is capable of transmitting broadcast signal 110 even when the user having broadcast device 100 is a distance away from authentication device 105. However, other implementations are contemplated, for example, wherein broadcast device 100 will only transmit broadcast signal 110 to authentication device 105 when broadcast device 100 is juxtaposed about or otherwise within an immediate vicinity of authentication device 105. To the extent broadcast signal 110 is broadcasted based on a threshold signal strength value of broadcast device 100, it should understood that the particular threshold used in a given situation may be dependent upon one or more factors, for example, the broadcast-capable technology comprised within broadcast device 100.

Authentication device 105 is capable of processing data stored within database 120, which data includes a plurality of stored identification codes and a plurality of stored facial data, wherein each stored facial data of the plurality thereof corresponds to a stored identification code of the plurality thereof. For example, each identification code and facial data set may be entered within database 120 simultaneously, or one may be entered after the other and the two may subsequently be linked. In an implementation, database 120 comprises at least one database. In a further implementation, database 120 is comprised within a server in communication with authentication device 105, or, alternatively, within a memory coupled to authentication device 105. Database 120 may be any repository configured to receive, store, and permit processing of the plurality of stored identification codes and the plurality of stored facial data.

Upon receiving broadcast signal 110, authentication device 105 sends query 115 to database 120 for a stored identification code that matches the identification code of broadcast signal 110. In the event no stored identification code is identified within database 120 as matching the identification code of broadcast signal 110, authentication device 105 may identify an error to the user requesting authentication, which may terminate the authentication process. However, in the event a stored identification code is identified within database 120 as matching the identification code of broadcast signal 110, indication of the stored facial data associated with the stored identification code (i.e., first facial data 125) is made. Indication of first facial data 125 indicates to authentication device 105 that it should proceed with processing the authentication transaction request.

In further processing the authentication transaction request, the identified first facial data must be compared against new facial data. Thus, authentication device 105, via the image capture component thereof, is configured to generate second facial data 130, which comprises facial feature data of the user requesting the authentication transaction. In an implementation, authentication device 105 generates second facial data 130 by taking or scanning a picture of the user 135 (which scanning may be done, for example, from an identification badge comprising the picture).

Once first facial data 125 and second facial data 130 are identified and generated, respectively, they are compared using facial recognition software to determine whether they match. The facial recognition software may comprise instructions executable by a processor of authentication device 105 or a server in communication with authentication device 105 and thus may be stored in a memory of authentication device 105 or the server in communication therewith. The facial recognition software may extrapolate various data from each of first facial data 125 and second facial data 130 in processing the comparison. Upon completion of the comparison, authentication device 105 may indicate whether first facial data 125 and second facial data 130 matched. In the event of a negative match, authentication device 105 may identify an error to the user requesting authentication, which may terminate the authentication process. In the event of a positive match, authentication device 105 may indicate the positive match to the user and/or the transaction station in communication therewith, thereby granting the user access to the object or area secured by authentication device 105, and thus authenticating broadcast device 100.

In a further implementation, authentication device 105 may be configured to detect gait data of the user of broadcast device 100, for example, by tracking his or her movements and gait cycle using a camera thereof. Authentication device 105 or a server in communication therewith may perform feature extraction on the detected gait data in order to identify a set of gait feature data newly generated based on the user's movements. As a further security means for authenticating the user, authentication device 105 may then attempt to identify gait feature data stored within a database in communication therewith and associated with the first facial data used by the facial recognition software described above. In the event such associated gait feature data is found within a database, the gait feature data generated based on the user's movements may be compared therewith to further validate the user's identity. For example, this may require a high-level comparison of gait cycle data including analysis and comparison of wave features and transformations. Upon determining a match between the newly generated gait feature data and the previously stored gait feature data, authentication device 105 may grant the user access to the object or area secured by authentication device 105.

Figure 2:
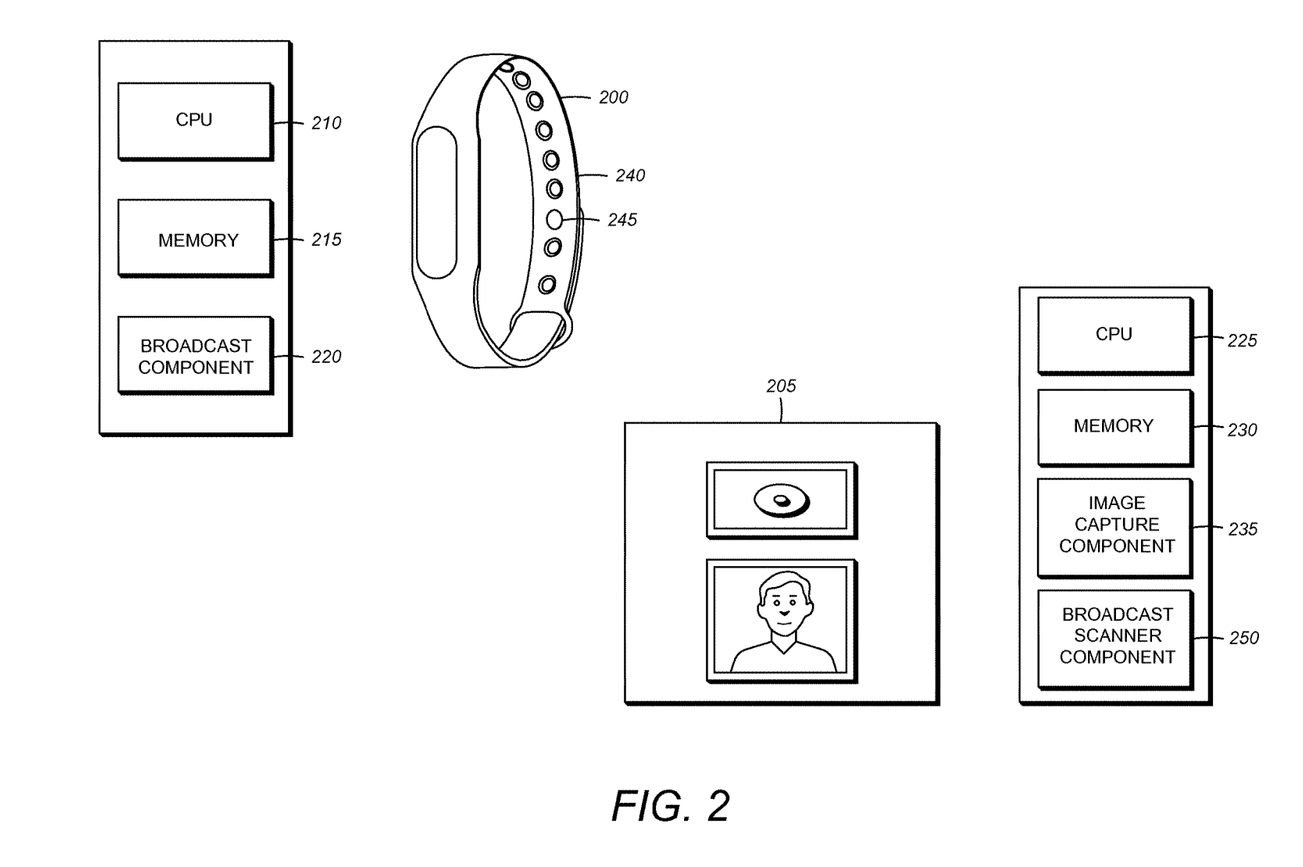
FIG. 2 is a diagram of a system configuration including a broadcast device and an authentication device according to implementations of this disclosure.

FIG. 2 depicts a system configuration for authenticating a broadcast device using facial recognition in accordance with the teachings herein as including broadcast device 200 and authentication device 205. In an implementation, broadcast device 200 comprises CPU 210, memory 215, and broadcast component 220. CPU 210 may comprise one or more central processing units. Alternatively, CPU 210 can be any other type of device, or multiple devices, capable of manipulating or processing information now-existing or hereafter developed. Although the examples herein can be practiced with a single processor as shown, advantages in speed and efficiency may be achieved using more than one processor.

Memory 215 may be a random access memory device (RAM) or any other suitable type of non-transitory storage device. Memory 215 can include code and data, such as the broadcast signal transmitted to authentication device 205, which may be accessed and processed by CPU 210. In an implementation, memory 215 can further include an operating system and/or one or more application programs including software components in the form of computer executable program instructions that cause CPU 210 to perform some or all of the operations and methods described herein. Broadcast component 220 is configured to broadcast the broadcast signal to authentication device 205. In an implementation, broadcast component 220 is a Bluetooth® low energy component. As discussed above with respect to FIG. 1, it will be apparent to one skilled in the art in view of the present disclosure that broadcast component 220 may be any component capable of broadcasting the broadcast signal from broadcast device 200 to authentication device 205 without first being interrogated for or otherwise being prompted to broadcast or transmit the broadcast signal.

In an implementation, broadcast device 200 further includes a display for presenting output to a user, for example, to indicate the successful transmission of a broadcast signal from broadcast device 200 to authentication device 205. The display may be a liquid crystal display (LCD), a cathode-ray tube (CRT), or any other output device capable of providing output from broadcast device 200. In a further implementation, the display is a touch screen display configured to receive touch-based input, for example, in manipulating data outputted thereto.

In an implementation, and as elsewhere described in this disclosure, broadcast device 200 is a wearable device such as a band 240 configured to be worn around a user's wrist. Band 240 may thus include CPU 210, memory 215, and broadcast component 220 disposed therein. Securing mechanism 245 may also be included to secure band 240 to the user. In an implementation, securing mechanism 245 is a slot and peg configuration. In an alternative configuration, securing mechanism 245 comprises a snap-lock configuration. It will be apparent to one skilled in the art in view of the present disclosure that various configurations may be contemplated for securing mechanism 245.

In an implementation, authentication device 205 comprises CPU 225 and memory 230, each of which being in accordance with similar features described above with respect to broadcast device 200. Authentication device 205 further comprises image capture component 235, which may be one or more cameras configured to generate a new picture by either taking a picture of a user or scanning a picture of a user. Scanning a picture of a user may include taking a picture of an existing picture of a user or extrapolating facial data therefrom. Regardless of the particular implementation by which it is generated, the picture generated by the image capture component 235 of authentication device 205 may be stored in memory 230. In an implementation, authentication device 205 includes broadcast scanner component 250 for scanning, receiving, observing, intercepting, determining, and otherwise identifying the broadcast signal from broadcast device 200.

In a further implementation, authentication device 205 further includes a communication component configured to receive the broadcast signal from broadcast device 200 and/or communicate with a database or a server on which the database is located. In a further implementation, authentication device 205 also includes a display in accordance with similar features described above with respect to broadcast device 200, which may, for example, show the second facial data upon the successful generation thereof. Additionally, authentication device 205 may further include one or more input devices including, without limitation, a keyboard, a numerical keypad, a mouse, a microphone or a gesture-sensitive input device.

Figure 3:
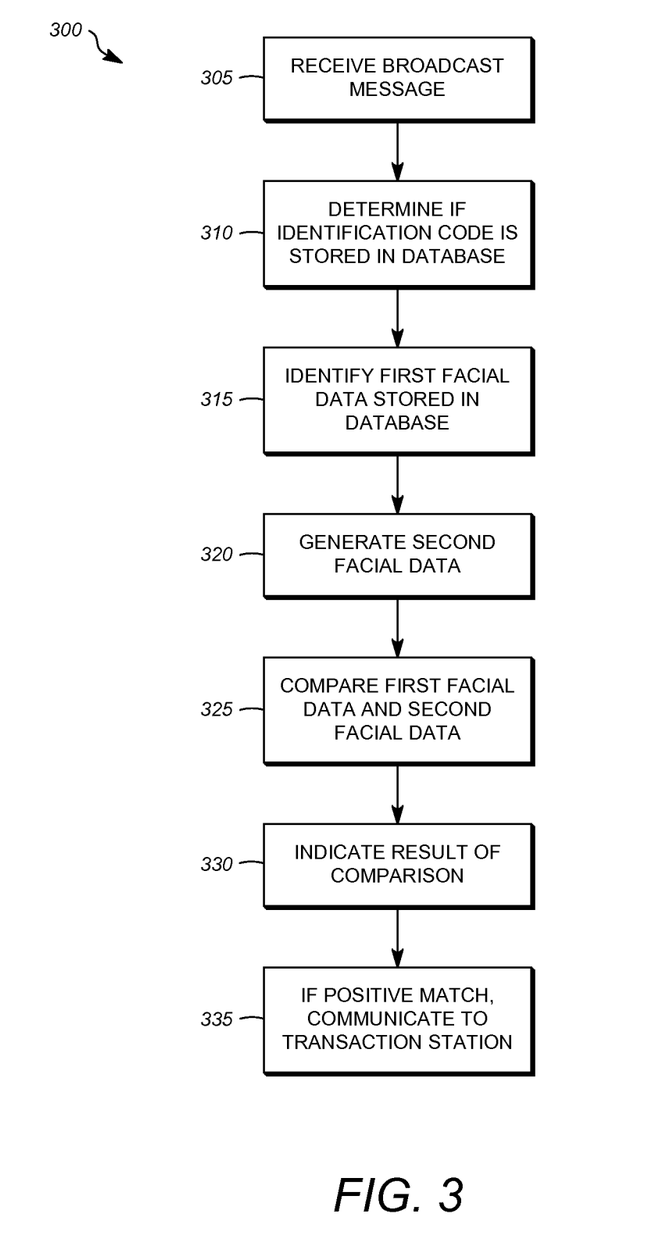
FIG. 3 is a flow chart showing an example of a process of authenticating a broadcast device using facial recognition according to implementations of this disclosure.

FIG. 3 is a flow chart showing an example of a method 300 for authenticating a broadcast device using facial recognition. The operations described in connection with method 300 can be performed at one or more computing devices, for example, a broadcast device, an authentication device, and a server. The operations described in connection with method 300 can be embodied as a storage device in the form of a non-transitory computer readable storage medium including program instructions executable by one or more processors that, when executed, cause the one or more processors to perform the operations.

The various operations of method 300 perform steps recited above with respect to the transmission of data (FIG. 1) and system diagram of the related components (FIG. 2). At operation 305, a broadcast signal is received from a broadcast device, such as a wearable device, by an authentication device. As described above, the broadcast device may be a device configured to constantly broadcast the broadcast signal until it is received, for example, by the authentication device. This may be done via one or more implementations, such as wherein the broadcast device comprises a Bluetooth® low energy device or otherwise includes a Bluetooth® low energy component. At operation 310, the authentication device processes the received broadcast signal by comparing the identification code comprised therein against a plurality of stored identification codes within at least one database to determine whether the identification code of the received broadcast signal is matches a stored identification code of the at least one database. This may require searching through multiple databases comprising stored identification codes, which databases may be in the memory of the authentication device or in the memory of a server in communication with the authentication device.

At operation 315, upon identifying a stored identification code with the database that matches the identification code transmitted within the broadcast signal from the broadcast device, first facial data associated with the identified, stored identification code within the database is identified. The first facial data may be pre-associated with its associated identification code, for example, wherein a single individual's picture is stored alongside the individual's own identification code, or wherein a plurality of individuals' pictures are stored alongside a group's identification code. At operation 320, second facial data is generated by the image capture component of the authentication device. The second facial data may be generated by the image capture component taking a picture of the individual requesting authentication or by scanning a picture of that individual, wherein scanning may involve taking a picture of the existing picture (which may, for example, be located on an identification badge) or extrapolating facial data from the existing picture.

At operation 325, the transaction station compares various facial feature data of the first facial data and the second facial data to determine whether the first facial data matches the second facial data. Facial recognition software may be used to detect various facial features within each of the first facial data and the second facial data wherein the comparison may occur between the individual features. The facial recognition software may be stored within a memory of the authentication device or a memory of a server in communication with the authentication device.

Figure 4:
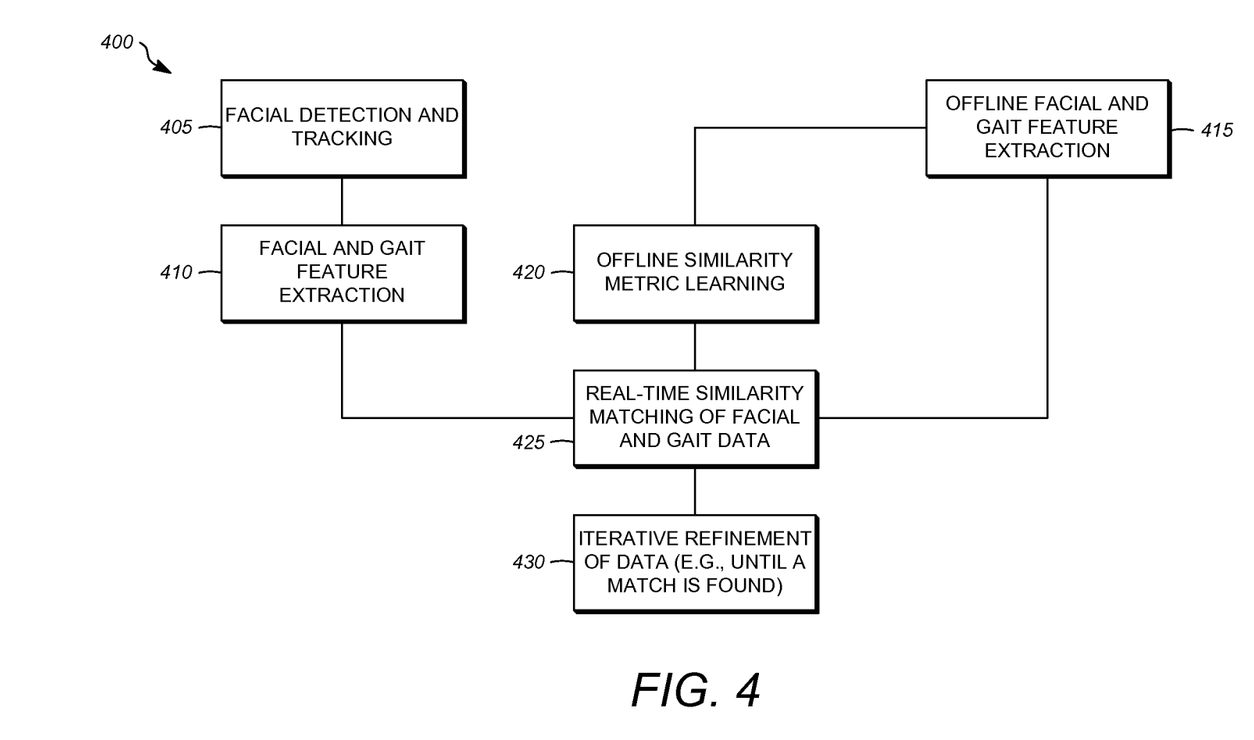
FIG. 4 is a flow chart showing an example of a process of processing and comparing an individual's facial and gait data according to implementations of this disclosure.

FIG. 4 details an example method 400 for processing and comparing the individual's data, which, in an implementation, may include one or more of facial and gait data. At operation 405, the individual's face is detected, for example, by a camera of an authentication device. At operation 410, features related to the individual's facial data and/or gait measurements are extracted, wherein the gait measurements may be identified, for example, by the camera in tracking the individual's movement within range thereof. In an implementation, the gait measurements are extracted based on video data obtained or otherwise identified by the authentication device. For example, the gait measurements may be extracted from a video recorded or otherwise created at or by the authentication device during the identification of the first facial data at operation 315 of FIG. 3. The video may be a motion video showing the individual's movement, a collection of pictures of the individual's movement processed in rapid succession, or any other media sufficient for identifying and tracking aspects of the individual's gait cycle.

Prior to, during, or after operations 405 and 410, operations 415 and 420 identify offline data relating to the individual's facial data and gait measurements, for example, from a database or other repository in communication with the authentication device or server on which method 400 is performed. In an implementation, the offline gait data comprises video data including a recording of the individual's gait, for example, by motion of the individual walking wherein distinct portions of the individual are marked and tracked through one or more video capture systems. Operation 420 receives as input features extracted from the facial data and gait measurement features in operation 410 and uses same to identify individuals by those data and measurements using one or more metric learning models.

As it relates to operations 415 and 420, in an implementation, operation 425 receives as input the extracted features of operation 415 directly outputted thereby along with the metric learning data directly outputted from operation 420. In an alternative implementation, operation 425 only receives as input the metric learning data of operation 420, which is obtained in part based on the extracted features of operation 415. At operation 425, the one or more of facial data and gait measurements tracked and feature extracted in operations 405 and 410 are compared against the offline data and measurements identified in operations 415 and 420. The operation includes identifying features similar to the compared data and measurements to identify matching instances. At operation 430, method 400 iterates through all of the data and measurements provided until the earlier to occur of a match being found and all of the data and/or measurements having been analyzed and exhausted.

Referring back now to FIG. 3, at operation 330, the result of the comparison of the first facial data and the second facial data is indicated. For example, wherein there is a positive match between those data, the authentication device may indicate the positive match to the user via a display thereof, and wherein those data do not match, the authentication device may indicate the lack of match by terminating the authentication transaction request and/or displaying the lack of match via on the display of the authentication device. At operation 335, upon indicating a positive match between the first facial data and the second facial data, the positive match indication is communicated to a transaction station coupled to or in communication with the authentication device in order to grant access to the object or area secured by the authentication device.

Amongst others noted and inferred, the present disclosure therefore provides benefits in requiring an additional level of authentication above facial recognition vis-à-vis the identification code that must be matched and expedites the facial recognition process by identifying first facial data prior to the user's arrival at authentication device. That is, in a typical facial recognition system, the stored facial data that is compared against the new facial data is not identified until after the new facial data is generated, given that such systems cannot pre-process the stored facial data by searching through a database therefor without any associated data being received. According to the present disclosure, however, by the time the user approaches the authentication device to initiate an authentication transaction request, the system and method herein disclosed will have caused the first facial data to already be identified (based on a comparison between the identification code received from the broadcast device and the stored identification code associated with the first facial data), which may drastically expedite the transaction.

As used herein, information, signals, or data are received by transmission or accessing the information, signals, or data in any form, such as receiving by transmission over a network, receiving by accessing from a storage device, or receiving by user operation of an input device.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the systems and methods described herein or their features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors modified with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

Certain portions of the implementations of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed implementations but, on the contrary, is intended to cover various modifications and equivalent arrangements included within the scope of the appended claims.

What is claimed is:

1. A method to expedite facial recognition authentication of a user using an authentication device with facial recognition software, the method comprising:
   receiving, by the authentication device, a broadcast signal from a wearable device worn by a user, the broadcast signal containing an identification code of the wearable device, the broadcast signal received by the authenticated device as a user wearing the wearable device approaches the authentication device;
   subsequent to the authentication device receiving the broadcast signal and prior to the user reaching the authentication device, retrieving, by the authentication device, first facial data from a database by querying the database based on the identification code, the first facial data including a previously generated image of a face of the user, wherein the first facial data and the identification code are associated with a common record stored in the database;
   responsive to the user reaching the authentication device, generating second facial data by generating a new image of the face of the user using an image capture component of the authentication device;
   determining whether the second facial data matches the first facial data by using the facial recognition software of the authentication device to compare the previously generated image of the face of the user and the new image of the face of the user; and
   responsive to determining that the second facial data matches the first facial data, communicating, from the authentication device, an indication of a positive match to a transaction station to cause the user to have access to the transaction station.

2. The method of claim 1, further comprising:
   indicating the positive match upon determining that the second facial data and the first facial data match using the facial recognition software of the authentication device.

3. The method of claim 1, wherein the transaction station comprises a vending machine, an automatic teller machine, a self-service machine, or a point of sales machine.

4. The method of claim 1, wherein the identification code and the first facial data are stored in the database prior to the authentication device receiving the broadcast signal from the wearable device.

5. The method of claim 1, wherein generating the second facial data by generating the new image of the face of the user using the image capture component of the authentication device comprises:
   taking a new picture of the face of the user using a camera of the image capture component.

6. The method of claim 1, further comprising:
   detecting gait data comprising gait measurements based on the movement of the user;
   identifying first gait features stored within the database, the first gait data features associated with the first facial data;
   extracting second gait data features from the detected gait data; and
   determining whether the second gait data features match the first gait data features.

7. The method of claim 1, wherein the wearable device comprises a Bluetooth Low Energy device.

8. An apparatus for expedited facial recognition authentication of a user wearing a wearable device, the apparatus comprising:
   a memory; and
   a processor configured to execute instructions stored in the memory to:
      receive, from the wearable device, a broadcast signal containing an identification code of the wearable device, wherein the identification code is associated with multiple individuals, wherein the user is one of the multiple individuals;
      subsequent to the receipt of the broadcast signal from the wearable device, retrieve, from a database, first facial data for the multiple individuals by querying the database based on the identification code, wherein the first facial data includes previously generated images of faces of at least some of the multiple individuals;
      generate second facial data by generating a new image of the face of the user using an image capture component;
      perform facial recognition against the first facial data and the second facial data to determine, using primarily the first facial data for the multiple individuals, whether the new image of the face of the user matches one of the previously generated images of the faces of the at least some of the multiple individuals; and
      responsive to a positive match from performance of the facial recognition against the first facial data and the second facial data, communicate an indication of the positive match to a transaction station to cause the user to have access to the transaction station.

9. The apparatus of claim 8, wherein the instructions include instructions to:
   indicate a positive match responsive to a determination that the new image of the face of the user matches the one of the previously generated images of the faces of the at least some of the multiple individuals.

10. The apparatus of claim 8, wherein the transaction station comprises one of an entry gate, an exit gate, a computing device, a mobile device, a vending machine, an automatic teller machine, a self-service machine, a point of sales machine, or a security device.

11. The apparatus of claim 8, wherein the identification code and the first facial data are stored in the database prior to the receipt of the broadcast signal from the wearable device.

12. The apparatus of claim 8, wherein the instructions to generate the second facial data by generating the new image of the face of the user using the image capture component include instructions to:
   take a new picture of the face of the user using a camera of the image capture component.

13. The apparatus of claim 8, wherein the instructions include instructions to:
- detect, using an image capture component of the apparatus, gait data comprising gait measurements based on movement of the user;
- identify first gait feature data for the multiple individuals associated with the identification code;
- extract second gait feature data from the detected gait data; and
- determine whether the second gait feature data matches one of the first gait feature data.

14. The apparatus of claim 8, wherein the broadcast signal is received from the wearable device responsive to a determination that a signal strength of the wearable device meets a threshold.

15. The apparatus of claim 8, wherein the wearable device comprises a Bluetooth Low Energy (BLE) device, and the BLE device constantly broadcasts the broadcast signal containing the identification code.

16. A wearable device, comprising:
- a body configured to be worn by a user, the body comprising a memory, a broadcast component comprising a Bluetooth Low Energy (BLE) component, a processor, and a display,
- wherein the memory is configured to store an identification code, the broadcast component is configured to constantly broadcast a Bluetooth signal comprising the identification code, the processor is coupled to the memory and the broadcast component, and the display is configured to indicate a successful transmission of the Bluetooth signal to an authentication device in wireless communication with the wearable device as a user wearing the wearable device approaches the authentication device,
- wherein the Bluetooth signal is used by the authentication device to query a database based on the identification code for first facial data including a previously generated image of a face of the user,
- wherein the Bluetooth signal is further used by the authentication device to determine that the user has reached the authentication device and responsively generate second facial data as a new image of the face of the user using an image capture component of the authentication device,
- wherein the authentication device is configured to cause the user to have access to a transaction station in communication with the authentication device responsive to determining, using facial recognition software, that the second facial data matches the first facial data.

17. The wearable device of claim 16, wherein the body comprises at least one of a band, a bracelet, a ring, a watch, a phone, or a mobile device.

18. The wearable device of claim 16, wherein the identification code comprises at least one of a username, a passphrase, a hash code, a hexadecimal code, a character array, or a MAC address.

19. The wearable device of claim 16, further comprising a securing mechanism for securing the body to the user.

20. The method of claim 1, wherein the identification code is shared with multiple users, and the first facial data comprises previously generated images of faces of at least some of the multiple users.

21. The apparatus of claim 8, wherein the first facial data is retrieved before the generation of the second facial data.

* * * * *